(12) United States Patent
Krause et al.

(10) Patent No.: US 6,996,297 B2
(45) Date of Patent: Feb. 7, 2006

(54) PMD EMULATION, MEASUREMENT AND COMPENSATION DEVICE

(75) Inventors: Egbert Krause, Burgstaedt (DE); Adalbert Bandemer, Herrsching (DE)

(73) Assignee: Thorlabs GmbH, Karlsfeld (DE)

( * ) Notice: Subject to any disclaimer, the term of this patent is extended or adjusted under 35 U.S.C. 154(b) by 0 days.

(21) Appl. No.: 10/398,273

(22) PCT Filed: Sep. 18, 2001

(86) PCT No.: PCT/EP01/10794

§ 371 (c)(1),
(2), (4) Date: Aug. 8, 2003

(87) PCT Pub. No.: WO02/32023

PCT Pub. Date: Apr. 18, 2002

(65) Prior Publication Data

US 2004/0028309 A1 Feb. 12, 2004

(30) Foreign Application Priority Data

Oct. 9, 2000 (DE) .......................................... 100 49 784
Oct. 28, 2000 (WO) .............................. PCT/DE00/03809

(51) Int. Cl.
*G02B 6/00* (2006.01)

(52) U.S. Cl. ......................................... 385/11; 359/483
(58) Field of Classification Search .................... 385/11, 385/24, 27, 123
See application file for complete search history.

(56) References Cited

U.S. PATENT DOCUMENTS 5,473,457 A 12/1995 Ono
5,859,939 A * 1/1999 Fee et al.

(Continued)

FOREIGN PATENT DOCUMENTS

DE 198 16 178 A1 10/1999
DE 198 18 699 A1 10/1999

(Continued)

OTHER PUBLICATIONS

Noe et al. "Ploarization Mode Dispersion Compensation at 10, 20, and 40 GB/S with Various Optical Equalizers," *Journal of Lightwave Technology*, IEEE, New York, USA, 17(9) pp. 1602–1616 (Sep. 1999).

Hok Uong Pua et al. "An Adaptive First–Order Polarization–Mode Dispersion Compensation System Aided by Polarization Scrambling: theory and Demonstration," *Journal of Lightwave Technology*, 18(6), pp. 832–841 (Jun. 2000).

Shimizu et al. "High Practical Fiber Squeezer Polarization Controller," Journal of Lightwave Technology, 9(10), pp. 1217–1224 (Oct. 1991).

*Primary Examiner*—Phan T. H. Palmer
*Assistant Examiner*—Jennifer Doan
(74) *Attorney, Agent, or Firm*—Finnegan, Henderson, Farabow, Garrett & Dunner

(57) ABSTRACT

A PMD emulation, measurement and compensation device is based upon an emulation device having a piece of fiber having a fixed differential group delay (DGD) and another short piece of fiber (or double refracting crystal) having a variable differential group delay (T-DGD). The two pieces of fiber are coupled with a non-zero torsional angle between their respective double refractive axes, preferably 45°. A fiber squeezer/stretcher is used to provide the variable DGD for the short piece of fiber. Various serial couplings of DGD and T-DGD fiber may be added to provide greater control and accuracy, with the torsional angles preferably alternating. Such an emulation device may be incorporated into a measurement device to measure the PMD-related distortion of an optical signal. Further the measurement device may be used in a PMD compensator where an emulation device in series with the optical signal path is controlled until the measured PMD in the PMD-related distorted optical signal is minimized.

26 Claims, 7 Drawing Sheets

U.S. PATENT DOCUMENTS

| | | |
|---|---|---|
| 5,930,414 A | 7/1999 | Fishman et al. |
| 6,381,385 B1 * | 4/2002 | Watley et al. ................ 385/28 |
| 6,538,787 B1 * | 3/2003 | Moeller et al. ............. 398/158 |
| 6,542,650 B2 * | 4/2003 | Khosravani et al. .......... 385/11 |

FOREIGN PATENT DOCUMENTS

| | | |
|---|---|---|
| DE | 198 30 990 A1 | 1/2000 |
| DE | 198 41 755 A1 | 3/2000 |
| EP | 1 109 338 A2 | 6/2001 |
| WO | WO 01/86333 A2 | 11/2001 |
| WO | WO 02/07351 A1 | 1/2002 |
| WO | WO 02/32023 A1 | 4/2002 |

\* cited by examiner

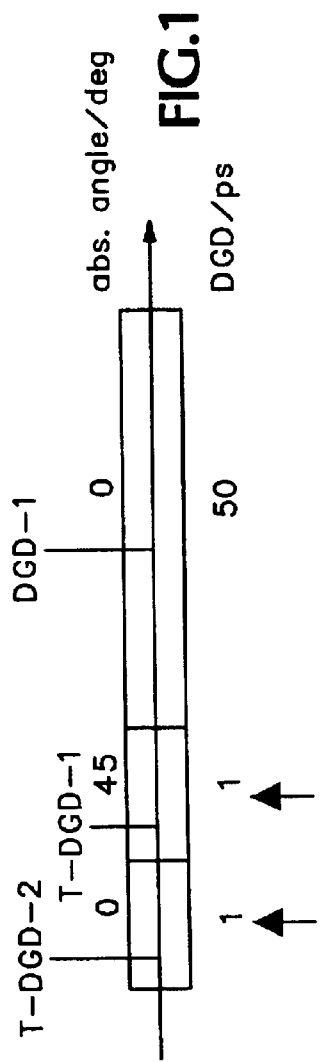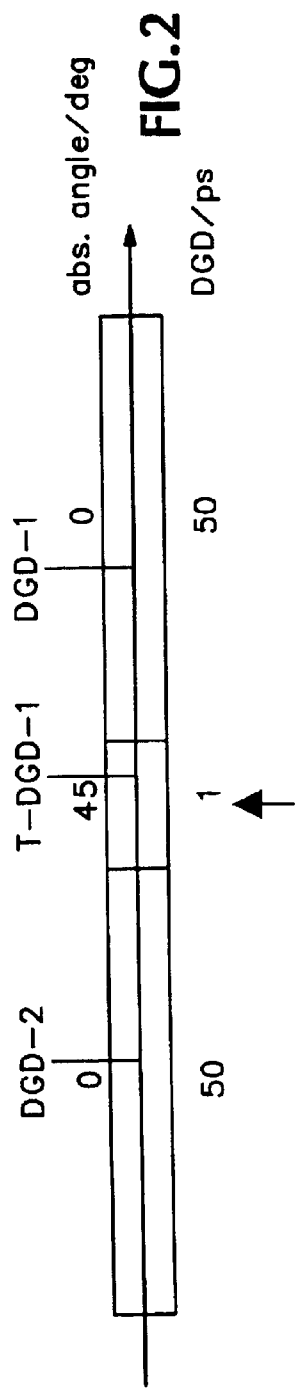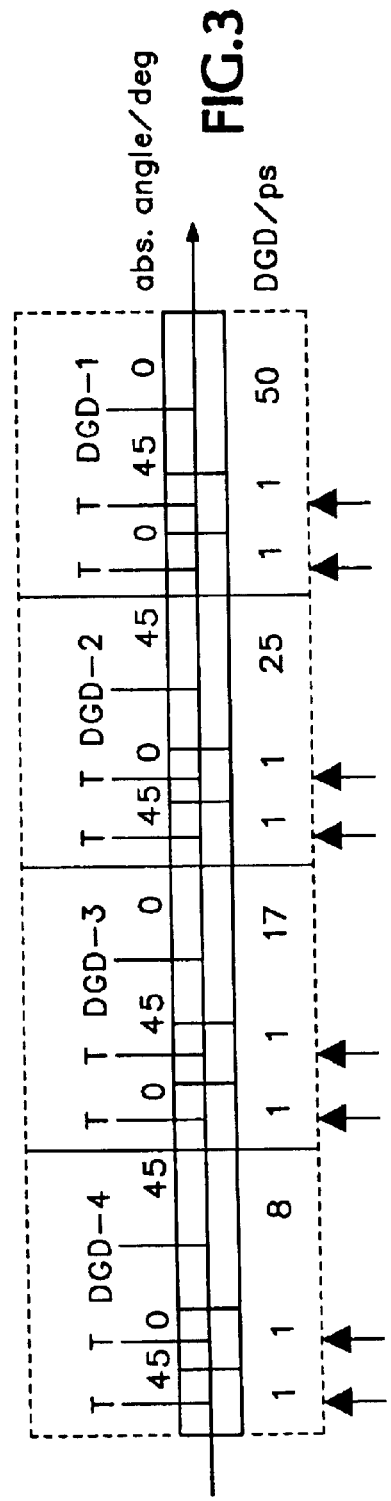

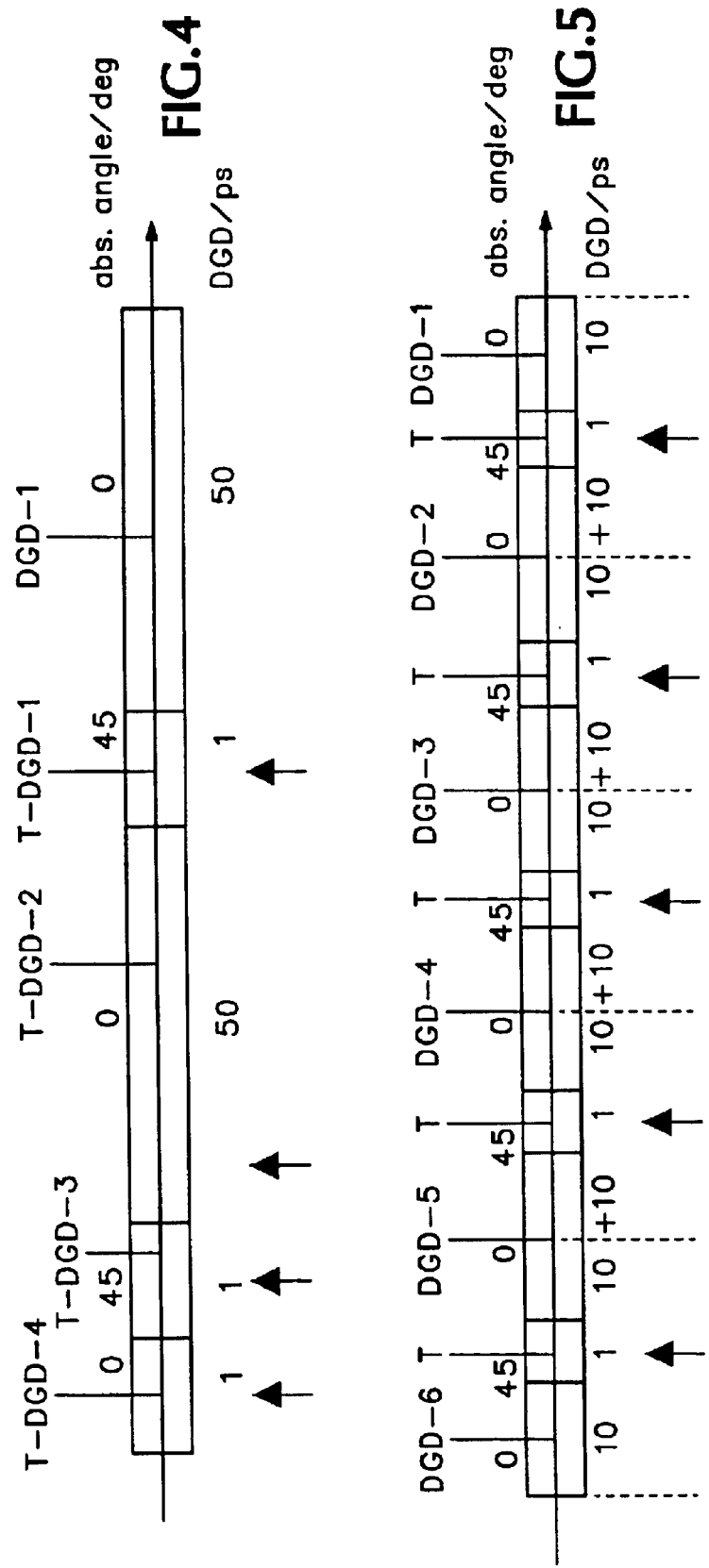

PMD EMULATION, MEASUREMENT AND COMPENSATION DEVICE

CROSS-REFERENCE TO RELATED APPLICATIONS

This application is a national stage entry of PCT/EP01/10794 filed on Sep. 18, 2001.

BACKGROUND OF THE INVENTION

The present invention relates to optical parametric testing, and more particularly to an emulation device for emulating a polarization mode dispersion (PMD) of an optical transmission system, a compensation device using such an emulation device, a measurement device for measuring a polarization mode dispersion (PMD)-related distortion of an optical signal, a compensation device using such a measurement device and a compensation device for compensating polarization mode dispersion (PMD)-related distortions in an optical transmission system.

Over the last decade, optical waveguides (glass fibers) have been increasingly used for the transmission of digital data streams. When data transmission is to be realized over a long transmission distance, so-called single-mode fibers (SMF) with low absorption coefficients are typically used. As a result of the polarization of electromagnetic radiation, the basic mode of such a single-mode fiber (hereinafter abbreviated as SMF) consists of two modes whose natural waves oscillate orthogonally with respect to one another. As a consequence, two polarization modes propagate in an SMF.

What is problematic about this is the fact that, for manufacturing reasons, the optical fibers are never fully isotropic, but can exhibit a weak, particularly geometrically caused double refraction. Hence, a change of the geometric dimension of an SMF core from an ideal circular to an elliptical cross-section has the consequence that the effective refractive indices along the elliptical semi-axes differ from one another. Mechanical stresses, too, can lead to a direction-dependent refractive index in a circular cross-section.

In this case, the two propagation methods, i.e., polarization modes, in the SMF have different group velocities so that the phase difference between the orthogonal modes does not remain constant. This change in phase difference leads to a change in the polarization state of the optical signal. Moreover, there is a strong coupling between the polarization modes of the SMF so that the influence of the double refraction in the SMF is subject to statistical fluctuations. Mechanical influences, such as minor bending of the SMF or vibrations as well as temperature changes, produce changes in the double refraction.

As a result of the different group velocities of the two mutually orthogonally oscillating natural modes of the SMF, there is what is known as polarization mode dispersion (PMD). The transit time delay between the two partial modes is referred to as differential group delay (DGD). Its mean value is called PMD delay and expressed by a PMD delay coefficient of units $ps/km^{1/2}$. Consequently, the polarization mode dispersion increases with the square root of the transmission line length. Modern SMFs with minimized PMD delay coefficients are today specified with less than 0.1 to 0.5 $ps/km^{1/2}$.

The transmission distance realizable under data loss considerations is inversely proportional to the square of the bit rate and to the square of the PMD delay coefficient, which is a parameter of the SMF. While PMD still constitutes a relatively small disturbing influence in optical fiber transmission systems with a transfer rate of 2.5 Gbit/s, it is a serious problem for modern 10 Gbit/s systems, and particularly for future 40 Gbit/s systems, which has a lasting adverse effect on the bit error rate.

Moreover, the PMD of an optical transmission system exhibits a pronounced wavelength dependency (second-order PMD: SOPMD, PMD2). Since in modern optical fiber transmission systems the transmission of a plurality of so-called channels with different optical wavelengths occurs through one SMF, there is for each channel, i.e., for each wavelength, a different PMD that leads to signal distortions.

The distortions in optical transmission systems which are produced by PMD have to be compensated for in high-rate data transfers in order to retain the signal quality and minimize the bit error rate. For this purpose, adaptive PMD compensators have been proposed which are incorporated into an optical transmission system on the receiver side in order to minimize or compensate for the signal-distorting influence of the transmission line PMD. Literature teaches different solution approaches to PMD compensation. In particular, electronic signal conditioners have been proposed which perform a PMD compensation at an electronic level following optoelectronic conversion of the optical transmission signal. It has been shown, however, that the correction of the "optical problem" at the electronic level is only promising to a limited extent.

More promising is a correction of the PMD-distorted signal at the optical level. The point of connection for such a PMD compensator is the DGD and the principal state of polarization (hereinafter abbreviated as PSP) at the output of the transmission system at the medium wavelength $\lambda_0$ of the optical signal. The task of the PMD compensator (PMDC) is to continuously measure the PMD of the transmission line and to emulate on the basis of the PMD determined a "compensation line" with a PMD transmission characteristic which is such that the optical signal, having traveled through said "compensation line", i.e., the emulator, is "equalized" or restored. It is advantageous if the measurement of the PMD-related distortions occurs after the signal has traveled through the compensation line. The PMD which still remains uncompensated is thus detected.

The main components of a PMD compensator are thus
 a measurement device that continuously measures the PMD of the optical transmission system,
 a controllable emulator that can reproduce as accurately as possible a transmission line with an adjustable PMD, and
 a control device that is connected to the measurement device and the emulator to adaptively control the emulator as a function of the measurement output signal of the measurement device such that the PMD of the transmission line is compensated by the emulator.

To this end the emulator must be designed so as to reproduce the DGD of the transmission line as accurately as possible. Moreover, the emulator must emulate a "compensation line" that exhibits an "inverse" PMD behavior. For this to happen, the fast output PSP of the transmission line must coincide with the input PSP of the emulator (of the compensation line) and vice versa.

Consequently, for a first-order PMD compensator it is important to
 generate an adjustable DGD, and
 rotate the PSPs of this adjustable DGD in all possible directions.

A second-order PMD compensator should also be able to emulate a wavelength-dependent DGD with wavelength-dependent PSPs, the PSPs again having to be freely rotatable.

A main component of a PMD compensator is thus the PMD emulator which, also in a stand-alone position, can be employed in a statistically significant way as a multiply adjustable, low-cost and low-loss component for emulating the frequency-dependent polarization transmission behavior of optical fiber lines of several 1,000 km in length at different points in time and different temperatures. Known PMD compensators are either incomplete because the type of the targeted control is not clarified, have a high level of optical and electronic components, or do not function satisfactorily. Products ready for the market are, to date, not known anywhere in the world.

A reason for this is on the one hand that in the past there was no measurement device available for PMD-related distortions designed sufficiently fast and sufficiently simple. Also, no emulator is known which can reproduce—with an acceptable adjustment expense—exactly the PMD of a real transmission line.

Typical requirements to be met by a PMD compensator or PMD emulator for optical transmission lines are:
- a large compensatable range of, for example, 0 to 100 ps,
- ability to correct down to a residual PMD that is as low as possible,
- quick correction in case of fluctuations on the transmission line,
- a safe control behavior for any type of PMD,
- no remaining of the control in local minimums
- a low insertion attenuation, and
- a low variance of the insertion attenuation.

For an introduction to the problems underlying the present invention, FIG. 13 shows, in a schematic representation, the influence of polarization mode dispersion (PMD) on an optical transmission line. The transmission line may be a long optical fiber line from a single-mode fiber with optical signal amplifiers installed in between, as are typically used for high-rate signal transmission systems, such as OC-192 or OC-768. As described above, an SMF exhibits two mutually orthogonal polarization modes. For production, design and/or installation reasons the fiber core of the SMF is not fully isotropic with regard to its refractive index. Instead, a low direction-dependency of the refractive index, for example as a result of mechanical deformation of the SMF, is unavoidable in practice.

This creates a mode-dispersion behavior of the transmission system which is referred to as polarization mode dispersion (PMD). PMD includes all polarization-dependent transit time effects for which the signal propagation may be described fully by the propagation behavior of two polarization modes that are independent of each other and orthogonal to one another. The signal components of different polarizations of the optical signal travel through the optical fiber at different group velocities. At the receiver the light components therefore arrive time-delayed with respect to one another; this transit time effect leads to a broadening of the received signal and thus to an impairment of the transmission quality. This can particularly lead to an increase in the bit error rate.

Since the described influence on the double refraction also depends significantly on the wavelength, the position of the principal states of polarization (PSP) and the transit time difference between the PSPs also exhibits a pronounced wavelength dependency. This is also referred to as second-order PMD (SOPMD or PMD2).

FIG. 13 illustrates the influence of a PMD-affected optical transmission line on a binary data signal. The signal is coupled into the transmission system with a state of polarization $SOP_{IN}$ which does not coincide with an input PSP of the system. Consequently, there is a power split of the optical signal into the two orthogonal PSPs. Because of the different group velocities of the PSP1 and the PSP2 modes, there is a group transit time delay, which is referred to as differential group delay (DGD) and which represents the first-order PMD. It manifests itself in a time shift of the PSP1 mode relative to the PSP2 mode. The SOPMD additionally leads to a broadening of each individual PSP mode.

The effects mentioned result in a wavelength-dependent PMD behavior, fluctuating over time, with time constants in the ms range up to the minute range. Such PMD-related distortions in optical transmission systems must be compensated for in high-rate data transmission in order to retain the signal quality. For this purpose—but also in a stand-alone position—PMD emulators and PMD measurement devices are required.

The PMD of a transmission system can, in simplified terms, be described by the square mean value of its wavelength-dependent DGD. Equally wavelength-dependent are the input PSPs and the output PSPs of the fiber. The situation relevant to an emulation device may be described in a first approximation by the DGD and the output PSP at the mean wavelength $\lambda_0$ of the optical signal.

What is desired is an emulation device for emulating a polarization mode dispersion PMD of an optical transmission system which can reproduce as accurately as possible the polarization transmission behavior of an optical transmission line with the adjustability being simple.

BRIEF SUMMARY OF THE INVENTION

Accordingly the present invention provides a PMD emulation, measurement and compensation device which reproduces as accurately as possible the polarization transmission behavior of an optical transmission line with simple adjustability.

Moreover, it is an object of the present invention to specify a compensation device that uses an emulation device of the said kind.

Moreover, it is the object of the present invention to propose a measurement device for measuring a polarization mode dispersion (PMD)-related distortion of an optical signal which allows a fast and accurate detection of the PMD of an optical transmission line.

Another object is to specify a compensation device that uses a measurement device as above.

Finally, it is the object of the present invention to specify a compensation device for compensating polarization mode dispersion (PMD)-related distortions in an optical transmission system which uses a control device that allows a fast and safe correction of PMD-related signal distortions.

Other objects, advantages and novel features of the present invention are apparent from the following claims and attached drawing.

BRIEF DESCRIPTION OF THE SEVERAL VIEWS OF THE DRAWING

FIG. 1 is a diagrammatic view of a first embodiment of an emulation device according to the present invention which allows the emulation of a transmission line with a predetermined DGD and an adjustable PSP.

FIG. 2 is a diagrammatic view of a second embodiment of an emulation device according to the present invention which allows the emulation of a transmission line with a variable DGD.

FIG. 3 is a diagrammatic view of a third embodiment of an emulation device according to the present invention with cascaded DGD elements, each with a variable PSP.

FIG. 4 is a diagrammatic view of a fourth embodiment of an emulation device according to the present invention with a variable DGD and a variable PSP.

FIG. 5 is a diagrammatic view of a fifth embodiment of an emulation device according to the present invention with a variable DGD with several DGD sections.

DETAILED DESCRIPTION OF THE INVENTION

Figure 6:
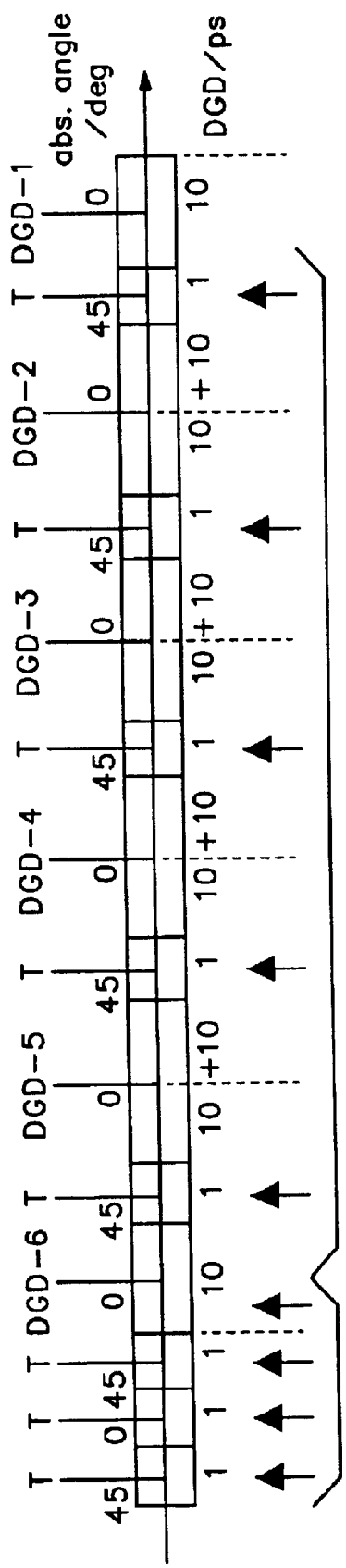
FIG. 6 is a diagrammatic view of a sixth embodiment of an emulation device according to the present invention with a variable DGD with several DGD sections and endless polarization transformation elements.

The object of an emulation device, which is to be used in particular in a PMD compensator, is to install in a counter position by way of an inverse reproduction which is as accurate as possible the transmission line DGD, i.e., a DGD of the same size with an opposite PSP, it being necessary that the fast output PSP of the transmission line coincides with the slow input PSP of the emulation line and vice versa.

For a comprehensive emulation device it is therefore necessary, in a first approximation, that 1. an adjustable DGD is generatable and that
2. the PSP of the adjustable DGD is rotatable into all possible directions. In a second approximation a wavelength-dependent DGD with wavelength-dependent PSPs should be generatable, the PSPs again having to be freely rotatable.

Emulation devices which satisfy the above requirements to different extents are described below with reference to FIGS. 1–7. Here, all embodiments of the emulation devices, which are described below, exhibit arrangements of polarization-maintaining fibers (PMF) that are connected via fiber splice connections (so-called splices). In the same way, the use of double-refracting crystals and short SM fiber pieces with a predetermined angle orientation of the "influential elements", such as fiber squeezers and/or stretchers, is also conceivable. Each splice realizes a fixed relative torsion between the double refracting axes involved in the PM fibers. Preferably, the torsional or orientation angle of adjacent PM fiber pieces is 45 degrees. The use of the same fiber type advantageously results in a small splice loss of the emulation device.

Preferably, a DGD of approximately 5 ps to 100 ps, or especially preferred 10 ps to 50 ps, is realized by the long PMF pieces. Short PMF pieces (a DGD in the range of around 0.005 ps to 5 ps, especially preferred 0.1 ps to 1 ps) are designed such that they become changeable in terms of their DGD through appropriate "influential elements" and thus act as PSP transformers. The low DGD of the variable DGD elements is of secondary importance compared with the DGD elements with a predetermined or predeterminable DGD.

According to a first aspect of the invention shown generally in FIG. 1, an emulation device for emulating a polarization mode dispersion PMD of an optical transmission system includes an emulator input for an optical input signal;

at least one controllable double refractive polarization transformation element T-DGD with a transformation element input and a transformation element output designed for the polarization transformation of the optical signal;

a least one double refractive DGD element with a DGD input and a DGD output, the DGD element exhibiting a differential group transit time (or group delay time) between two mutually orthogonally polarized propagation modes or polarization modes of the DGD element; and an emulator output for a PMD-modified optical output signal;

the polarization transformation element T-DGD and DGD element being disposed in relation to each other in the optical signal path between the emulator input and the emulator output such that the double refracting axes at the transformation element output are twisted by a torsional angle which is different from zero degrees in relation to the double refracting axes at the DGD input.

The emulation device exhibits a sequential arrangement of the emulator input, the polarization transformation element T-DGD, the DGD element and the emulator output in this sequence. The polarization transformation element is designed to transform in a controllable way the state of polarization of an incoming optical signal.

However, the polarization transformation element does not have to be designed as a "full" polarization adjuster that reproduces any state of polarization on any other state of polarization. Owing to the fact that there is a firm relationship between the double refracting axes between the polarization transformation element T-DGD at its transformation element output and the double refracting axes of the DGD element at its DGD input, the requirements with respect to the transformation characteristics and the necessary transformation degrees of freedom of the polarization transformation element used are lower than with conventional emulation devices for which there are no such torsional angle relationships.

For conventional emulation devices, "universal" polarization adjusters are typically employed which exhibit three transformation degrees of freedom independent of each other. The three degrees of freedom are necessary to transform a random state of polarization into another random state of polarization. A polarization transformation of this kind is illustrated by a so-called Poincaré sphere, each of whose surface points defines a state of polarization. In order to get from a surface point of the Poincaré sphere established by the Stokes vectors $S_1$, $S_2$, $S_3$ to another surface point, three transformation steps are necessary in the worst case. Because if, for example, the transformation axis around which the first transformation step is executed happens to run through the state of polarization to be transformed (point on the surface of the Poincaré sphere), no polarization transformation can be achieved by such first polarization transformation step because no new surface point on the Poincaré sphere is reached. In this degenerated case, both additional polarization transformation steps, which are independent with respect to each other, are thus needed to detect every surface point of the Poincaré sphere.

However according to the present invention there is a predetermined or predeterminable relationship between the double refracting axes of the polarization transformation element T-DGD and the DGD element, which advantageously leads to a reduction of the number of necessary independent polarization degrees of freedom of the polarization transformation element.

For example, in order to provide an emulation device that exhibits a predetermined DGD and an adjustable input PSP, it is already sufficient to arrange a polarization transformation element T-DGD on the signal input side in front of the DGD element, and to ensure a predetermined or predeterminable torsional angle relationship between the double refracting axes of the DGD element and of the polarization transformation element. In the case mentioned it is, for example, already sufficient to provide two independent polarization transformation degrees of freedom (two "influential" variables such as two fiber squeezers) of the polarization transformation element. A "universal" polarization adjuster, which would have to exhibit three polarization transformation degrees of freedom, can be dispensed with.

The emulation device herein described thus manages with a lower number of "influential elements" or polarization transformation degrees of freedom, respectively, for the same DGD or PSP adjustability. In other words, fewer influential elements have to be provided than with comparable conventional emulation devices. Since the adjustment expense of an emulation device increases dramatically with the number of the influential elements to be adjusted, i.e., the controllable polarization transformation elements, the emulation device described herein is far easier and hence faster to adjust. It is thus very well suited for emulation and compensation tasks for which a fast (in the ms range) and accurate PMD emulation is important.

The polarization transformation element has at least one double refracting variable DGD element with an adjustable differential group transit time (or group delay time) $DGD_{var}$. The polarization transformation is thus obtained via an adjustable DGD, i.e., group delay time difference between the orthogonally polarized propagation modes of an optical transmission line (for example an SMF). With the variable DGD it is possible to produce in a targeted fashion phase differences between the orthogonal propagation modes that result in a transformation of the state of polarization of the optical signal.

The $DGD_{var}$/DGD quotient generally is smaller than 0.5 and preferably smaller than 0.1. The task of the polarization transformation element, which includes a variable DGD element for the polarization transformation, is only an appropriate transformation of the state of polarization, not the provision of a DGD to be emulated. In other words, the polarization transformation element only has to ensure that the input PSPs are appropriately transformed.

Particularly preferred is an emulation device for which the polarization transformation element includes a plurality of double refracting variable DGD elements arranged one after the other in the signal path. For example, the polarization transformation element may have two variable DGD elements which are arranged in the signal path in front of or behind a DGD element with a predetermined or predeterminable DGD.

Neighboring variable DGD elements of the plurality of variable DGD elements are arranged such that their respective double refracting axes are twisted relative to each other by a torsional angle that is different from zero degrees. Thus there is a predetermined or predeterminable relationship of the respective neighboring or adjoining relative orientations of the double refracting axes between the individual DGD elements, which are variable and fixed DGD elements in relation of the double refracting axes of the DGD input.

The torsional angle may be in the range of 30 degrees to 60 degrees and preferably approximately 45 degrees. Especially preferred is an arrangement for which the orientation angles of the variable and fixed DGD elements move in an alternating torsional angle sequence. If, for example, the orientation angle of a first (variable or fixed) DGD element is 0 degrees, the DGD element following in the signal path could exhibit an orientation angle of the double refracting axes of 45 degrees. The next following (variable or fixed) DGD element could again exhibit an absolute orientation angle of 0 degrees. In total there would thus be an orientation angle sequence that is 0 degrees, 45 degrees, 0 degrees. In the same way, it is also possible to arrange the absolute orientation angles of the double refracting axes of the individual (fixed or variable) DGD elements as an ascending sequence.

The DGD element has at least one polarization-maintaining optical fiber and/or at least one double refracting crystal, and the polarization transformation element has at least one polarization-maintaining optical fiber, at least one double refracting crystal and/or a comparatively short single-mode fiber (SMF). Especially preferred is a design variant in which both the fixed DGD elements and the variable DGD elements are designed as polarization-maintaining fibers (hereinafter abbreviated as PMFs).

If an SMF with a mechanical influencing element, such as a fiber squeezer or stretcher, is to be used for the polarization transformation elements, the SMF has to be so short that it causes no unwanted random or uncontrolled polarization transformation. Preferably, an SMF whose length is designed just sufficiently to arrange a fiber squeezer or stretcher next to it is therefore used. Preferably the (fixed) DGD elements directly follow the fiber squeezer. It is thus particularly advantageous to select the length of the SMF to be only insignificantly longer than the fiber length squeezed by the fiber squeezer. For example, the length not covered by the fiber squeezer or stretcher is less than 10 cm, preferably less than 5 cm and, especially preferred, less than 3 cm. The uncontrolled polarization transformation by the SMF pieces not covered by the fiber squeezer is then negligibly small. In such a case the double refraction of the SMF is stress-induced so that the double refraction axis of the SMF coincides with the orientation or squeeze axis of the mechanical influencing element, particularly with the squeeze direction of a fiber squeezer.

The conventionally used polarization transformation elements that exhibit an SMF in combination with fiber squeezers, however, always use only comparatively long single-mode optical fibers. In particular, on such known polarization transformation elements, the fiber sections not covered by the fiber squeezer are so long that they cause uncontrolled or unwanted polarization changes. Thus, in the prior art there is no fixed torsional angle relationship between the double refracting axis of the SMF (which, in this case, is the squeeze axis of the fiber squeezer or stretcher) and the respective double refracting axes of neighboring (fixed) DGD elements.

The polarization transformation element has at least one mechanical adjustment element that exerts a mechanical effect to change $DGD_{var}$ and preferably has a fiber squeezer and/or stretcher. In particular, the polarization transformation element has for this purpose a PMF on which the fiber squeezer and/or stretcher acts. The $DGD_{var}$ of this PMF piece may be adjusted in a targeted fashion by way of the mechanical influence of the mechanical adjustment element, which is a double refracting optical fiber, on the PMF.

Figure 10:
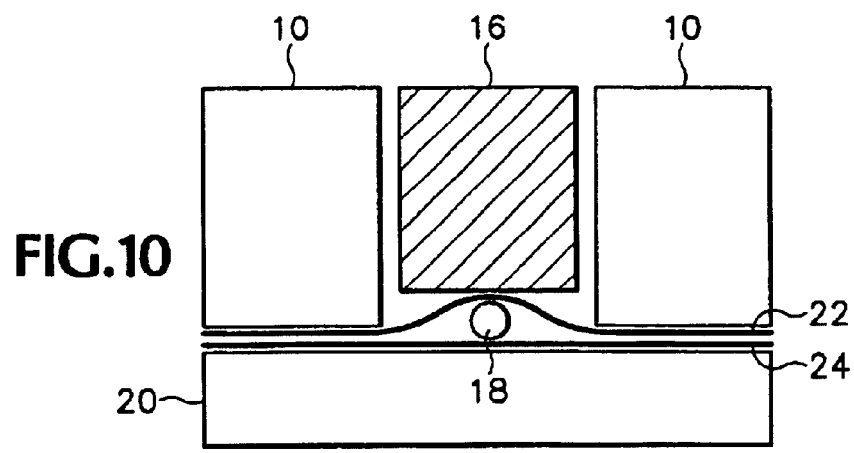
FIG. 10 is a partial cross-sectional view of a first embodiment of a fiber squeezer according to the present invention with a slip foil.
Figure 11:
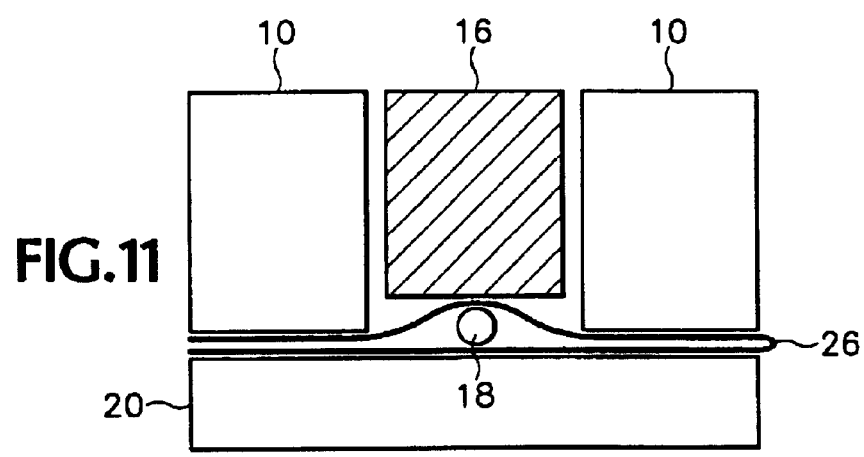
FIG. 11 is a partial cross-sectional view of a second embodiment of a fiber squeezer according to the present invention with a slip foil.
Figure 12:
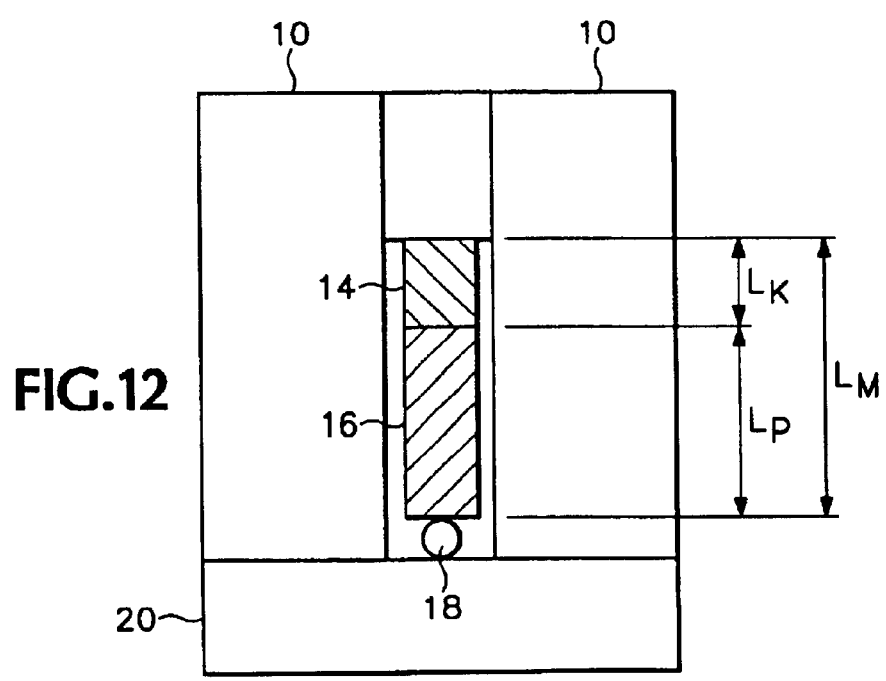
FIG. 12 is a partial cross-sectional view of a third embodiment of a fiber squeezer according to the present invention with passive temperature compensation.
Figure 13:
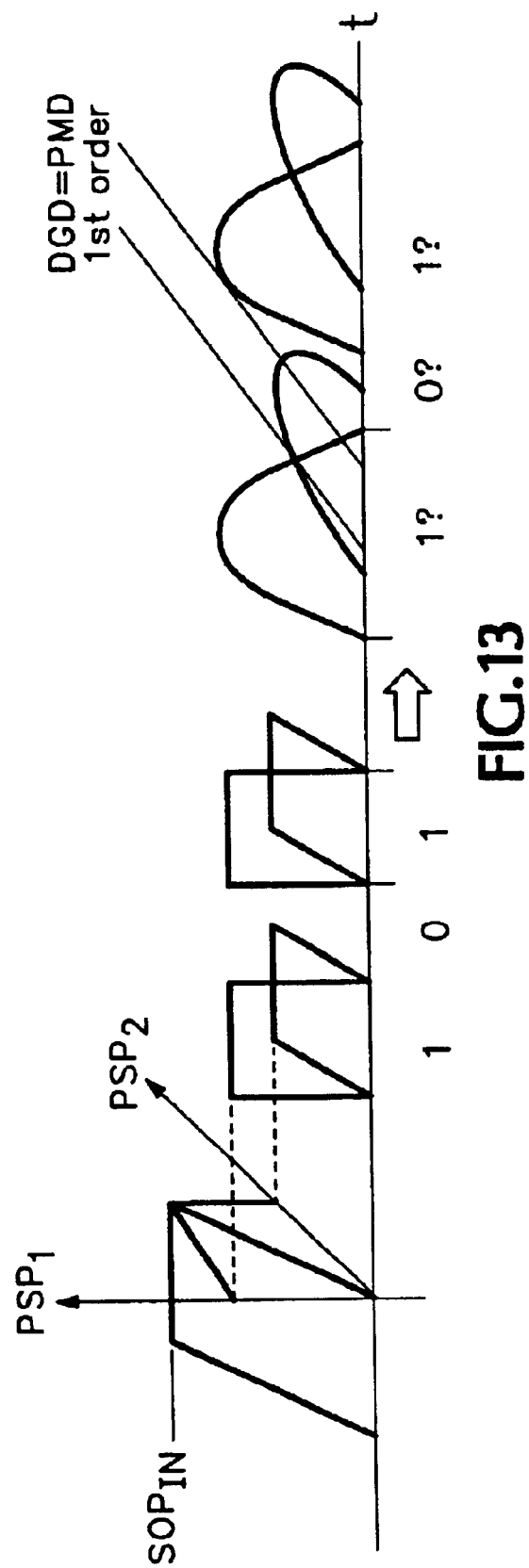
FIG. 13 is a systematic signal-time diagram view illustrating a PMD-related signal distortion.

The fiber squeezer or stretcher has a piezo-electric element which, for the damping of transversal oscillations, is guided in a bearing housing on the sides by elastic oscillation attenuators as shown in FIGS. 10–12. On modern emulation devices the piezo-electric element, to which an electrical signal may be applied to generate a predeterminable mechanical effect, has to have an exact and reproducible type of effect on the PMF. The aim is in particular to force back the influence of inevitable oscillations and/or vibrations of the fiber squeezer or stretcher on the polarization transformation behavior. An elastic guide of the piezo-electric element arranged on the side which suppresses the transversal oscillations of the piezo-electric element leads to a noticeable increase in the reproducibility and accuracy of the mechanical adjustment element.

The fiber squeezer or stretcher has the piezo-electric element positioned in such a way, via a thermally compensating compensation element on a bearing housing, that the resulting thermal expansion coefficient of the arrangement of the piezo-electric element and the compensation element is equal to the thermal expansion coefficient of the bearing housing. Accordingly, the compensation element is designed such that the thermal expansion coefficient of the total arrangement of the piezo-electric element and the compensation element corresponds exactly to that of the bearing housing. Inevitable temperature variations to which such a fiber squeezer is subjected in this case do not lead to a fluctuation of the mechanical stress on the fiber.

Polarization transformation elements which use mechanical adjustment elements are subjected for design reasons to temperature-dependent fluctuations. If, for example, the mechanical adjustment element heats up, the thermal expansion of the individual components may cause the mechanical effect, i.e., the compression or tensile stress, acting on the fiber to change. The influence of such temperature fluctuations may be minimized by providing a compensating compensation element on the piezo-electric element, the geometric dimensions and thermal expansion coefficient of which are tuned to the piezo-electric element used in such a way that the thermal expansion coefficient of the total arrangement of the piezo-electric element and the compensating element is equal to the thermal expansion coefficient of the surrounding bearing housing. A temperature fluctuation then only leads to all components of the mechanical adjustment element thermally expanding in the same way, without there being a change in the tensile and/or compression stresses exerted on the fiber.

The fiber squeezer uses a squeezing stamp with a foil, preferably a metal foil arranged between the fiber to be squeezed and the squeezing stamp, such that twisting of the fiber is avoided when the squeezing stamp slips.

In order to further improve the accuracy and reproducibility of mechanical adjustment elements which are used in polarization transformation elements, it is thus proposed to arrange a thin foil between the squeezing stamp and the fiber. It is preferred that the foil runs not only between squeezing stamps and fibers, but also encloses the latter on the side facing away from the squeezing stamp. Slipping of the squeezing stamp on the fiber, which may conventionally lead to a disturbing change of the polarization transformation, is less critical when the metal foil is used because now the slipping of the squeezing stamp on the fiber is not linked to a twisting of the latter.

Especially preferred is an emulation device in which the polarization-maintaining optical fiber of the polarization element at the transformation element output is spliced with the polarization-maintaining optical fiber of the DGD element at the DGD input in such a way that the torsional angle between the double refracting axes at the transformation element output relative to those at the DGD input is not equal to 0 degrees, as indicated above. The torsional angles of the double refracting axes of adjacent (variable or fixed) DGD elements are thus defined by a corresponding splicing of the individual PMF pieces. The emulation device is a sequential, spliced arrangement of PMF fiber pieces for which the splice angles change particularly in an alternating sequence.

According to a second embodiment shown in FIG. 2, a second double refracting DGD element is arranged between the emulator input and the polarization transformation element. An emulation device designed this way allows in a most simple fashion the emulation of an optical transmission line with a variable DGD. The polarization element arranged between the two DGD elements with a predetermined and/or predeterminable DGD is capable of linking the input PSP of the first DGD element positioned downstream in the signal path with the output PSP of the second DGD element positioned upstream in the signal path in such a way that—depending on the adjustment of the polarization transformation element—in the one case the sum of the DGDs of the first and the second DGD element and in the other case the difference of the two DGD element results. Owing to the continuous transition from the summation point to the substraction point, all intermediate values may be set.

It is especially preferred to select the angle between the double refracting axes of the second DGD element and the polarization transformation element to be between 30 and 60 degrees, especially 45 degrees. Hence a torsional angle sequence is preferred at which the second DGD element (on the signal input side) exhibits an absolute orientation angle of the double refracting axes of 0 degrees, the polarization transformation element of 45 degrees, and the first DGD element of 0 degrees. Alternatively, the first DGD element can also exhibit an absolute orientation angle of the double refracting axes of 90 degrees. What is worth noting is the fact that in the aforementioned cases only a single polarization transformation degree of freedom of the polarization transformation element has to be provided to produce an emulation device with a variable DGD.

The aforementioned emulation device may have a second polarization transformation element arranged between the emulator input and the second DGD element. While the polarization transformation element arranged between the first and the second DGD element mainly produces a variable total DGD of the emulation device, the second polarization transformation element may be used to appropriately transform the input PSP of the emulation device.

A plurality of polarization transformation elements and DGD elements may be arranged between the emulator input and the emulator output in an alternating sequence as shown in FIG. 3, with at least one of the polarization transformation elements being a variable DGD element or, as a maximum, two variable DGD elements with a twisted orientation relative to each other. Such an arrangement of polarization transformation elements and DGD elements with a fixed DGD, which is "sequential" in the direction of the signal, allows in particular a more accurate emulation of the optical transmission line to be emulated. In particular, such a cascaded configuration also allows the emulation of a transmission line with a second (and, if appropriate, higher) order PMD. In view of the additional degrees of freedom that are provided by the higher number of polarization transformation elements, a more accurate adaptation of the PMD of the optical transmission line to be emulated is achieved.

As shown in FIG. 4 the polarization transformation element on the emulator input side may have a maximum of four variable DGD elements twisted relative to each other, and the other elements are a variable DGD element or, as a maximum, two variable DGD elements twisted relative to each other. Such an emulator device allows an accurate and fast adjustment of a (higher order) PMD with a lower-than-conventional number of polarization transformation degrees of freedom, i.e., a lower number of "influential elements", being provided owing to the predetermined and/or predeterminable orientation of the double refracting axes of the individual elements relative to each other. The low number of degrees of freedom allows a faster and simpler adjustment of the emulation device which makes it particularly suitable for time-critical PMD compensation tasks.

Figure 8:
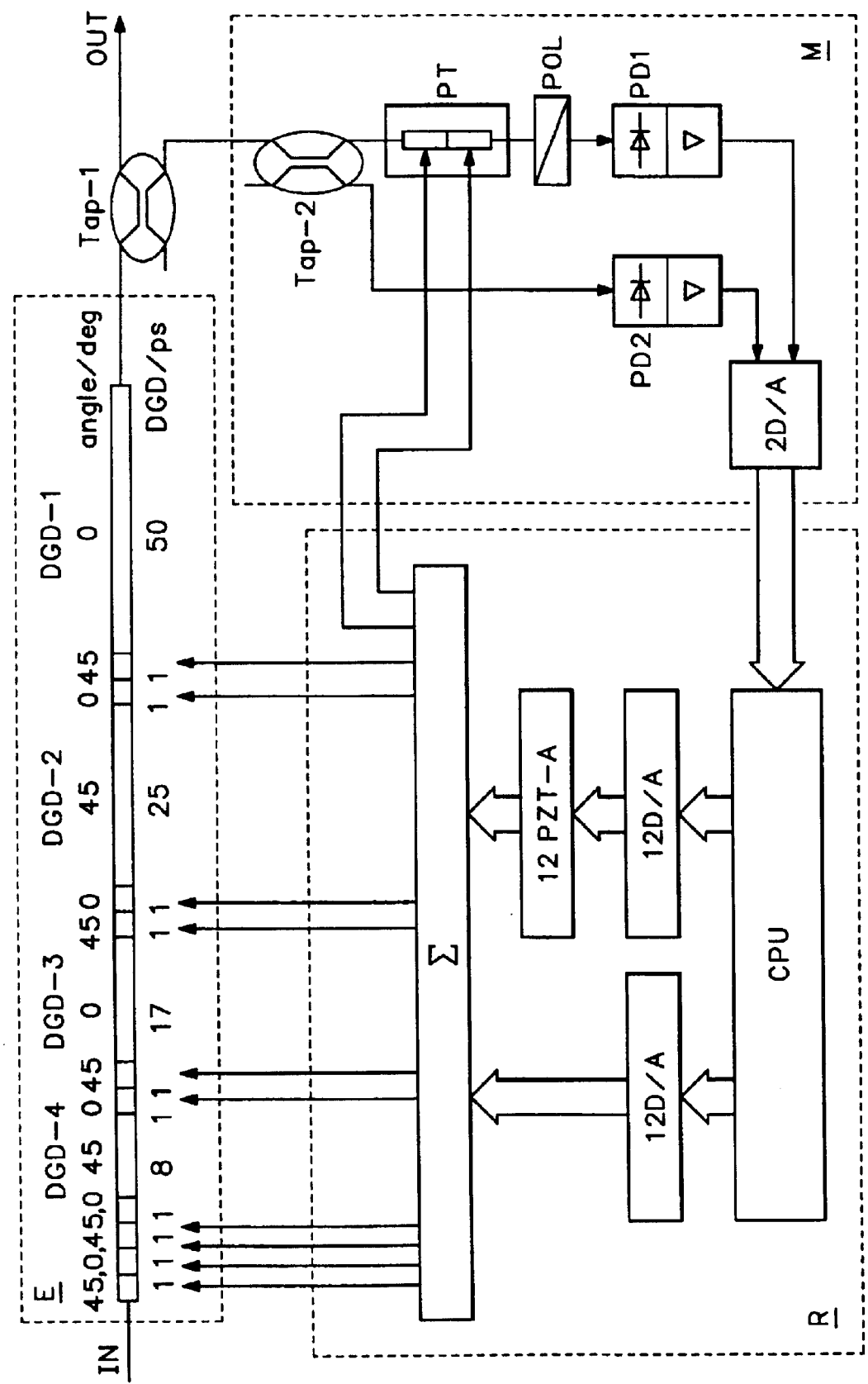
FIG. 8 is a block diagram view of an embodiment of a compensation device according to the present invention with a DSP as a control device.
Figure 9:
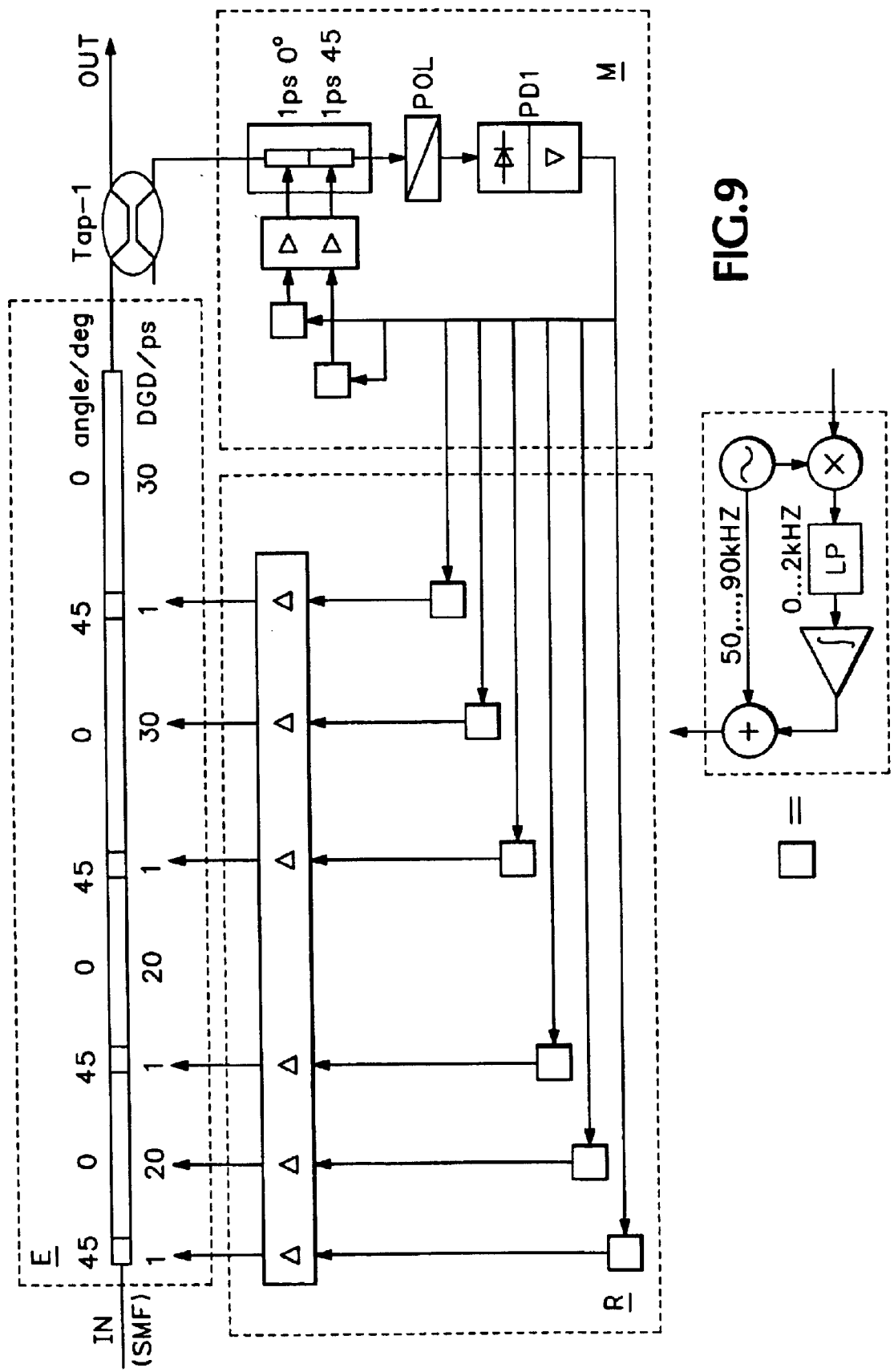
FIG. 9 is a block diagram view of a further embodiment of a compensation device according to the present invention with an analog control device.

A compensation device for compensating polarization mode dispersion (PMD)-related distortions in an optical transmission system as shown in FIGS. 8 and 9 has an emulation device, the emulator input being designed for the input of a PMD-distorted optical signal and the emulator output being designed for the output of an optical output signal;

a measurement device for measuring the PMD-related distortion of the optical signal and outputting a corresponding measurement output signal; and a control device which sees the measurement output signal and which controls the emulation device in such a way that the latter minimizes, and preferably fully compensates, the PMD-related distortion.

The compensation device thus exhibits the known basic configuration of a PMD measurement device that measures a PMD which results from the optical transmission line and the emulation device, which hands over measurement values to a control device, and which then adjusts the emulation device such that the total PMD returns to a minimum. This is the case when the emulation device generates an "inverse" PMD behavior, i.e., as far as possible the same DGD with an inversely oriented PSP for compensating the PMD-related distortions.

The measurement device for measuring a polarization mode dispersion (PMD)-related distortion of an optical signal has a measurement input for the optical signal;

at least one polarizer;

at least one polarization transformation element which is designed for the polarization transformation of the optical signal and in which the signal path of the optical signal is arranged between the measurement input and the polarizer;

at least one photo detector for detecting the intensity $P_{pol}$ of the optical signal which is arranged in the signal path of the optical signal downstream of the polarizer; and a control and output device connected to the polarization transformation element and the photo detector which controls the polarization transformation element such that the intensity $P_{pol}$ is either at a minimum or maximum and generates a measurement output signal which corresponds to the minimum or maximum intensity $P_{pol}$, min or $P_{pol}$, max, respectively, as a measure of the PMD distortion of the optical signal.

Thus the measurement of the PMD of a transmission line occurs in a purely optical way and is fundamentally different from conventional electrical PMD detection methods. The point of connection for the PMD detection is an indirect and simplified measurement of the degree of polarization of the PMD-distorted optical signal.

The measurement principle is based on the following thought. If (a) DGD=0, or (b) the input state of polarization ($SOP_{in}$) relative to the input PSP of the optical transmission line is such that it coincides with the input PSP, then there is no PMD-related signal distortion. In other words an optical transmission line generates no PMD-related distortions if either DGD=0 or if an optical signal is coupled into the transmission line in such a way that the input polarization ($SOP_{in}$) coincides exactly with an input PSP of the transmission line.

If one of the aforementioned conditions is fulfilled, the following applies:

(c) the state of polarization of the optical signal at the output of the transmission line is wavelength-independent, i.e., $SOP_{out}(\lambda)$=constant, and, moreover, (d) the degree of polarization (DOP) equals 100%.

The conditions (c) and (d) are conditional upon each other. Conversely, it is true that a PMD-related distortion occurs if a DGD exists and $SOP_{in}$ does not coincide with an input PSP. In this case $SOP_{out}(\lambda)$ is not constant over the wavelength and DOP is smaller than 100%.

While a rigorous measurement of $SOP_{out}(\lambda)$ is possible, it requires a substantial and hence costly apparatus configuration. A rigorous measurement of the degree of polarization as a measure of the PMD by means of a polarimeter is also possible. However, here too the use of a polarimeter leads to an extensive and hence costly apparatus configuration which also is not fast enough for PMD compensation tasks.

A modified or indirect measurement of the degree of polarization of the PMD-distorted output signal is proposed. To this end the measurement device exhibits a polarizer with a predetermined or predeterminable polarization axis which has a photo detector mounted downstream for measuring the optical output across the whole relevant wavelength range. Between the measurement input for a PMD-distorted optical signal and the polarizer there is a polarization transformation element which is controlled by a control and output device in such a way that it controls the total optical power detected by the photo detector to an extreme.

Preferably the control and output device controls the polarization transformation element in such a way that the total optical power $P_{pol}$ is minimized, i.e., that it assumes the minimum value $P_{pol,min}$. The polarization transformation element thus matches the input polarization of the PMD-distorted optical input signal to the polarizer. A detected optical power $P_{pol}=0$ means that all spectral components of the optical data signal hit the polarizer with the same (namely the orthogonal) polarization. The optical signal hitting the polarizer is in this case fully polarized, i.e., DOP=100%. This in turn means that there is no PMD-related signal distortion.

The control of the polarization transformation element to an extreme of the optical power detected by the photo detector, which is performed by the control and output device, occurs very quickly if a dither or modulation technique, which is described later in connection with a control device for a compensation device, is used for the control circuit. In this process, the influential elements of the polarization transformation element see a low-frequency modulation frequency whose modulation components are detected with a correct phase and amplified in the output signal of the photo detector. In this way, the twisting inwards of the polarization of the optical signal orthogonally to the polarization axis of the polarimeter occurs in a targeted fashion and quickly.

A second photo detector may be provided for the detection of the total intensity $P_{tot}$ of the optical signal in front of the polarization transformation element and the control and output device outputs a measurement output signal corresponding to the normalized minimum or maximum intensity $P_{pol,min}/P_{tot}$ or $P_{pol,max}/P_{tot}$, respectively. This quotient formation of the polarized optical power to the total power makes the normalized signal independent of the absolute light power. In addition, disturbing amplitude-modulated signal components which originate from the optical data signal are cancelled down and do not cause a disturbing influence on the measurement signal.

The polarization transformation element has at least one variable DGD element with a differential group transit time (or group delay time) $DGD_{var}$ which is adjustable with respect to the transformation of the polarization.

The polarization transformation element preferably has two variable DGD elements which are arranged such that their double refracting axes are twisted relative to each other by a torsional angle which is different from 0 degrees.

As has already been shown in detail in connection with the emulation device described above, the number of necessary transformation degrees of freedom are reduced by a predetermined or predeterminable fixing of the torsional angle between the double refracting axes of two neighboring or adjacent DGD elements of a polarization transformation element. Preferably, the torsional angle is approximately 45 degrees. The two variable DGD elements, which can be designed according to the variable DGD elements that have been described in connection with the emulation above, twist inward any PMD-distorted optical signal with respect to its state of polarization in such a way that the total optical power downstream of the polarizer exhibits an extreme.

The variable DGD elements each have a polarization-maintaining optical fiber PMF and a mechanical adjustment element which exerts a mechanical effect on the optical fiber to change $DGD_{var}$, preferably a fiber squeezer and/or stretcher. The fiber squeezer and/or stretcher has a configuration as described above.

A compensation device for the compensation of polarization mode dispersion (PMD)-related distortions in an optical transmission system has an emulation device with an emulator input to input a PMD-distorted optical signal and an emulator output to output an optical output signal;

a measurement device to measure PMD-related distortions of the optical signal and output a corresponding measurement output signal; and a control device which sees the measurement output signal and which controls the emulation device in such a way that the latter minimizes and preferably fully compensates the PMD-related distortion.

The compensation device for compensating polarization mode dispersion (PMD)-related distortions in an optical transmission system may also have an emulation device with an emulator input to input a PMD-distorted optical signal and an emulator output to output an optical output signal, the emulation device exhibiting a plurality of controllable polarization transformation elements and a plurality of DGD elements;

a measurement device to measure PMD-related distortions of the optical signal and to output a corresponding measurement output signal; and a control device which sees the output signal and which controls the emulation device in such a way that the latter minimizes and preferably fully compensated the PMD-related distortion, with the control device being designed to output an adjustment signal to the polarization transformation elements, which is superimposed by a periodic modulation signal, to detect, with the correct intensity and phase, corresponding modulation components in the measurement output signal, and to produce a new adjustment signal as a function of the modulation components detected.

The control device of the compensation device is based on a dither and/or modulation technique. To this end the control device sends an adjustment signal to each polarization transformation element of the emulation device to adjust the desired PMD of the emulation device. In addition, the control device superimposes the adjustment signal with a periodic modulation signal of a small amplitude (preferably smaller than 5% of the total adjustment signal amplitude). The polarization transformation element modulated in this way generates a corresponding modulation component in the optical signal. This modulation component is reflected in the measurement output signal of the measurement device and is detected selectively for frequency and phase by the control device.

In this way the control device deterministically detects the influence which a certain change of the adjustment signal, which is output to the polarization transformation element, has on the characteristic of the optical signal. In particular, owing to the frequency and phase-specific detection of the modulation components in the measurement output signal, the control device draws a conclusion as to whether an increase or decrease of the adjustment signal is necessary to achieve the control aim.

In the same way, based on the described detection with the correct phase, the control device may also draw a conclusion as to how much the control signal has to be increased or decreased in order to obtain as quickly as possible a full correction of the PMD distortion.

Contrary to this, the control devices for PMD compensation devices, as are known in the prior art, are exclusively based on a trial-and-error control, with an "influential parameter" of the adjustable emulation device being changed randomly to check if this change has a positive influence on PMD compensation. Under the prior art, the control does therefore not occur in a targeted deterministic way but randomly according to the principle of coincidence.

By comparison, the targeted control of the emulation device by the detection, with the correct phase and frequency, of the modulation components in the output signal allows a simpler and much faster compensation of PMD-related distortions in optical transmission systems.

Preferably the modulation frequencies of the modulation signals are different for each polarization transformation element. Preferably the modulation frequencies are in a frequency range of 20 kHz to 500 kHz, and especially preferred, 40 kHz to 150 kHz.

FIG. 1 shows the first embodiment of the emulation device which allows the emulation of a transmission line with a predetermined DGD and an adjustable PSP. The emulation device exhibits one long and two comparatively short PMF pieces. The long PMF piece DGD-1 is the DGD element, which exhibits a DGD of 50 ps, for example. The short PMF pieces T-DGD-1 and T-DGD-2 only exhibit DGDs of approximately one ps each, but are each equipped with an "influential element " via which the DGDs of T-DGD-1 and T-DGD-2 are modified in a targeted way. Influential elements used may be, for example, mechanical adjustment elements, preferably fiber squeezers and/or stretchers. Owing to the variable DGD of T-DGD-1 and T-DGD-2, they act as polarization transformation elements. In FIG. 1 (and the following figures) the "influential elements" which represent exactly one polarization transformation degree of freedom are shown schematically by arrows pointing upwards below the PMF sections.

In FIG. 1 the DGD element DGD-1 produces a fixed DGD whose input PSP corresponds to the principal axes of the PMF (linear 0 degrees and 90 degrees). The polarization transformation element T-DGD-1 located in front is always capable, because of the double refracting axes rotated by 45 degrees, of transforming the linear PSP into PSPs that are located on a great circle of the Poincaré sphere which runs through the points H-R-V-L. If the usual definition of the Stokes vectors is used as a basis (cf., for example, "Principles of Optics", Max Born and Emil Wolf, $7^{th}$ edition, Cambridge University Press 1999, page 33), this great circle cuts through the Stokes vectors $S_1$ and $S_3$.

The freely movable input PSPs (from the vantage point of the T-DGD-1 element) on the great circle are again transformed by the T-DGD-2 element in such a way that a rotation occurs around the H-V axis, i.e., around the Stokes vector $S_1$, on the Poincaré sphere. Consequently, the great circle with the input PSP is rotated such that it covers the entire surface of the Poincaré sphere. Thus the total arrangement of the two polarization transformation elements T-DGD-1 and T-DGD-2 with the DGD element DGD-1 exhibits a universally adjustable (input) PSP for a fixed DGD (of 50 ps in this example).

In the prior art, emulation devices have been proposed several times, which use a full or general polarization adjuster (e.g. an appropriate multi-stage fiber squeezer) connected in series with a DGD element, a general polarization adjuster being understood as a device that can transform any state of polarization into any other state of polarization.

The disadvantage of such prior art emulation devices is that an unequivocal and stable connection between the PSP of the DGD and the axes of the adjusting element located in front is always missing. The reason for this is the random polarization transformation of a comparatively long connecting fiber, which is typically an SMF and therefore responds sensitively to position and/or temperature changes.

With such conventional emulation devices, cases are therefore conceivable, which lead to an ineffectiveness of the last "influential element" of the multi-stage polarization adjuster, because, as a result of the transformation of the connecting fiber, the polarization adjuster's axes coincide with the axes of the DGD element, and hence there is a "degeneration". So in order to guarantee a universal PSP adjustment, i.e. a PSP adjustment that covers all possible states of polarization, at least one additional "influential element" (for example an additional fiber squeezer) is required in comparison to the embodiment described on the basis of FIG. 1. While the embodiment described manages with two variable DGD elements, conventional emulation devices, which exhibit the same emulation possibilities, require at least three such elements.

A special advantage of this embodiment of the emulation device is that it has only PMF elements and no connecting fiber elements. All sections thus retain their axial direction in case of fiber movements and temperature changes. A random adjustment of the input PSP is in any case guaranteed with only two adjustment elements.

Alternatively, it is possible to replace the PMF of the polarization transformation elements by an SMF, under the condition that the fixed allocation of the axial position of the DGD-1 element and the transformation elements T-DGD-1 and T-DGD-2 is retained. This is guaranteed by having the PMF of the DGD element DGD-1 run right up to the influential element of T-DGD-1 and having the torsional angle between the double refracting axis of the DGD element DGD-1 and the orientation axis of the influential element obtained by an inclination in the design. If the influential element of the polarization transformation elements T-DGD-1 and/or T-DGD-2 is, for example, a mechanical fiber squeezer or stretcher, the orientation axis of the influential element is the squeezing axis of the fiber squeezer or stretcher. In order to prevent a random polarization transformation by polarization transformation elements, which use SMFs, the SMF piece used must be so short that random and unwanted polarization transformations by the SMFs are negligible.

Owing to this measure, all T-DGD elements described until now, i.e., T-DGD elements and/or T-elements, which are based on PMFs may also be replaced by SMFs. Where SMFs are used as transformation elements, the splice angles of preferably 45 degrees only have to be supplemented by design measures that guarantee a geometric inclination of preferably 45 degrees between the individual squeezing angles of the fiber squeezers.

FIG. 2 shows another embodiment of an emulation device. This embodiment is characterized by the fact that an adjustable DGD is generated with only a single polarization transformation element T-DGD-1. The basis is formed by the two DGD elements DGD-1 and DGD-2, which preferably exhibit the same size. However, unequal DGD values are also conceivable.

The transformation element T-DGD-1 is capable of linking the input PSP of the DGD-1 element with the output PSP of the DGD-2 element in such a way that in one case the sum DGD-1+DGD-2, and in another case the difference DGD1−DGD-2, result. Because of the continuous transition from summation to substraction, all intermediate values may be adjusted. The polarization transformation element T-DGD-1 exhibits this characteristic because it is connected to the two neighboring DGD elements DGD-1 and DGD-2 with a torsional angle that is different from zero degrees. Preferably the torsional angle is 45 degrees. The absolute angle settings 0-45-0 and 0-45-90 degrees of the torsional angles between the three DGD elements are of equal value. The fixed splice angles of preferably 45 degrees guarantee in any case a full transformation between the summation and the substraction points.

Alternatively, the T-DGD-1 element may be replaced by a shorter SMF piece, if the neighboring DGD elements are run right to the SMF so that no further polarization transformations occur. The splice angles of preferably 45 degrees give way to a geometric inclination of 45 degrees between the squeezing axis of the fiber squeezer and the principal/main axes of both PMF elements.

The further embodiment of an emulation device shown in FIG. 3 basically illustrates a cascaded arrangement of four emulation devices according to the embodiment of FIG. 1. Each emulation device thus exhibits one DGD element (DGD-1 to DGD-4) and two upstream polarization transformation elements T (FIG. 3 and T-DGD according to FIG. 1, respectively) for twisting the PSP inwards. The size of the DGD elements may be selected to be the same, be staged or be otherwise. What is preferred is a staging of the DGD values in such a way that all intermediate values from zero to the total sum of the DGD values are adjustable.

A DGD vector has a vector with the length DGD and the direction of a PSP (e.g., the fast PSP). Each "base emulation unit" shown in FIG. 3 with a broken line thus advantageously generates a DGD vector. The cascading of independent, randomly rotatable PMD vectors allows a bigger emulation flexibility, so that even the PMD behavior of complex transmission lines may be exactly reproduced. In the embodiment shown, the DGD values of 0 to the sum of the individual DGD values are adjustable and higher-order PMD effects are generatable. The larger number of emulation degrees of freedom allows a better adaptation to the PMD of the fiber line to be compensated than would be possible with an individual adjustable DGD element. Contrary to the cascaded emulator arrangement described in the prior art, this embodiment of an emulation device is economic because only two adjustment elements, i.e., two fiber squeezers, per cascade suffice for a general PSP adjustment.

The embodiment shown in FIG. 4 represents a further development of the emulation device described on the basis of FIG. 2. The aim is to make the input PSP on the emulation device universally adjustable, i.e., adaptable for any states of polarization desired. To this end, the DGD element DGD-2, which in FIG. 2 is a DGD element with a (fixed) predetermined DGD, is replaced by a variable DGD element T-DGD-2. In addition, two further polarization transformation elements T-DGD-3 and T-DGD-4 are positioned upstream in the signal path. Owing to these three additional influential or adjustment elements, which are again represented by arrows, the input PSPs of the arrangement are freely rotatable in every direction. This is not achievable with only the two front polarization transformation elements, because the remaining arrangement according to FIG. 2 has no fixed PSPs but PSPs that are dependent on the position of the variable DGD element T-DGD-1.

The variable DGD element T-DGD-2 ensures in any case that the arrangement of T-DGD-2, T-DGD-1 and DGD-1 always receives input PSPs, which the variable DGD element T-DGD-3 can reproduce in PSPs on a great circle of the Poincaré sphere and the variable DGD element T-DGD-4 may reproduce on all possible surface points of the Poincaré sphere, i.e., all states of polarization.

FIG. 5 shows yet another embodiment of the emulation device. This is based on the embodiment shown in FIG. 2, which is developed further such that several similar arrangements are cascaded, with the two fixed DGD elements in each case "melting" into one DGD element having the sum of the DGD values. This embodiment can, if the DGD values are selected as indicated as an example in the figure, adjust a DGD of 0–100 ps. It thus has the same adjustment range as the embodiment described on the basis of FIG. 2, but differs by essential features.

In the case of a center adjustment, the embodiment according to FIG. 2 produces input PSPs that are strictly periodic over the wavelength. For example, at a DGD of 50 ps per DGD element the PSP period is only 0.16 nm and thus just corresponds to the optical bandwidth of a 10 Gb/s signal. The higher the DGD values of the individual DGD elements selected, the smaller the PSP period. Small PSP periods may, however, have an adverse effect on the adjustability of the emulation device. This is based on the fact that good PMD emulation (or PMD compensation) of a transmission line is only reached if the transmission line shows PSP fluctuations that are similarly strong, which cannot generally be presumed. The embodiment shown in FIG. 5 is therefore advantageous because a far more versatile structure is possible as a result of several individual DGD elements which are linked through the polarization transformation elements T. This way DGD values of e.g. 0, 20, 40, 60, 80 and 100 ps may be set which exhibit no PSP variation whatsoever over the wavelength (pure $1^{st}$ order PMD). This is always the case when all transformation elements connect in each case to their neighboring DGD sections (10 ps) to give the sum or difference.

In addition there is the possibility of generating a higher-order PMD, with one or several polarization transformation elements being located in an intermediate position. Hence, DGD values are adjustable which also exhibit 20, 40, 60 or 80 ps DGD, but also provide a wavelength-dependent DGD and PSP. All DGD values between 0 and the DGD sum (100 ps) are adjustable.

This plurality of variation possibilities provides the prerequisites for a much better and more broadband adaptation of the transmission line, i.e., a fiber line, and of the PMD emulation device when it is used in a PMD compensator. A PMD compensator (abbreviated as PMDC) which uses such an emulation device may—assuming the corresponding measurement and control devices are available—compensate also for higher-order PMDs.

If the emulation device is used in the PMD compensator, it should allow a so-called endless polarization control. This is understood to be the ability of polarization transformation elements to produce no polarization skips when the adjustment elements of the polarization transformation elements reach the limit of their adjustment range. An endless polarization control must rather guarantee a continuous, steady polarization adjustment. Polarization skips in optical transmission systems may lead to transmission errors, i.e., to an adverse increase of the bit error rate.

Contrary to this, an endless adjustment of the DGD is not necessary because it is only necessary to switch between a minimum (0 ps) and a maximum (100 ps). A problem may arise if the adjustment elements themselves exhibit a large drift, such as a temperature drift. If, for example, an adjustable DGD element is required to provide the maximum DGD of 20 ps, for example, the transformation element T always has to maintain the same polarization rotation, such as 0 degrees. If, however, the adjustment element, i.e., the fiber squeezer, reaches the limits of its range, a DGD of less than 20 ps is produced. Before the next maximum is reached at 20 ps, the DGD also sweeps over values of a minimum 0 ps. Consequently the maximum error equals the maximum DGD (20 ps in the example chosen).

One embodiment of the emulation device which exhibits an endless polarization possibility is shown in FIG. 6. The emulation device exhibits a total of five sections with 10 ps+polarization transformation element+10 ps, the numerical values having to be understood as examples. So, a total DGD of a maximum 100 ps is adjustable. When the aforementioned drift effects are taken into account it has to be expected, however, that a DGD element does not generate 20 ps but temporarily only 0 ps. The total DGD of the arrangement would thus be limited to 0 ps–80 ps.

To overcome this limitation it is sufficient to provide one additional adjustable DGD section with 0 ps to 20 ps. With this a maximum of 120 ps is thus achievable. Should the aforementioned drift phenomena occur, sufficient 0 ps to 20 ps are still adjustable. Each adjustable DGD section is thus replaceable by all others. The control ensures that no more than one section executes a reset, i.e., a resetting polarization movement, at the same time.

In FIG. 6 a four-stage endless polarization adjuster having four PMF sections is used. However, contrary to conventional emulation devices, since one section is directly integrated into the front DGD element DGD-6, only another three further PMF sections are provided.

Figure 7:
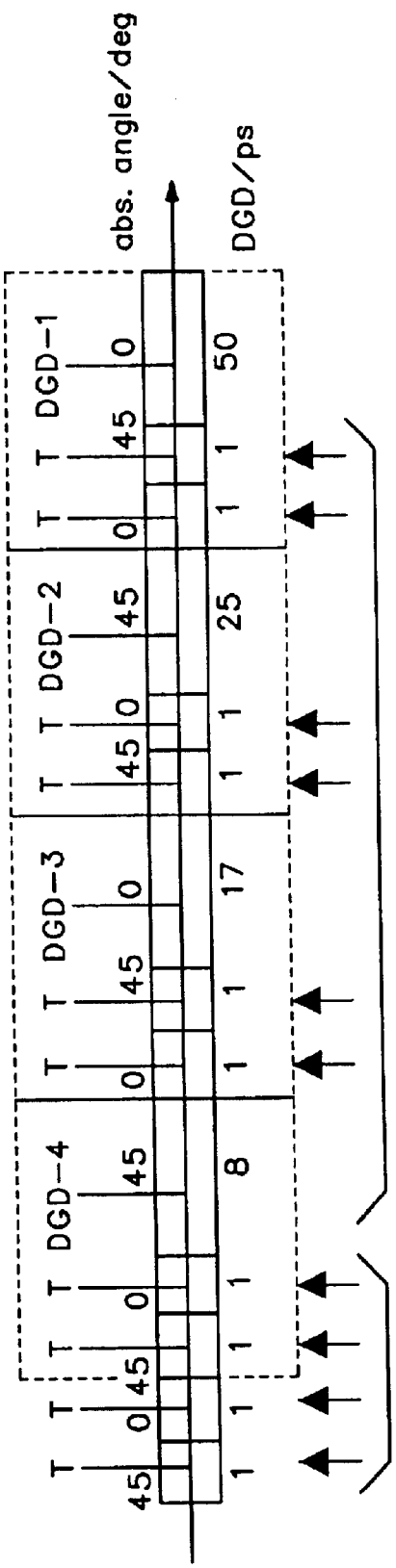
FIG. 7 is a diagrammatic view of a seventh embodiment of an emulation device according to the present invention with cascaded DGD elements, each with a variable PSP and endless polarization transformation elements.

FIG. 7 shows a development of the embodiment of an emulation device described on the basis of FIG. 3 which allows an endless polarization control. As already described above, an endless DGD adjustment is not necessary because one only switches between a minimum (0 ps) and a maximum (100 ps) DGD.

The embodiment according to FIG. 3 has the advantage that the PSP of the total arrangement is already universally determined by two polarization transformation elements at the input. In order to be able to execute the polarization transformations in an endless fashion, only two further polarization transformation elements thus have to be added. Thus, a four-stage endless polarization adjuster is used which has four PMF sections.

FIG. 8 shows an especially preferred embodiment of a compensation device. The compensation device (PMDC) has an emulation device E and a measurement device M, each of which are connected to a control device R, the control device controlling the emulation device E as a function of the measurement output signal of the measurement device M in such a way that the emulation device exhibits a DGD of the same amount but inverse direction PSP to those of the transmission line to be compensated. A PMD-distorted optical signal, which is input to the emulator input IN, leaves the emulator output OUT in a PMD-compensated, or at least PMD-minimized, signal form. What needs to be noted is that in the embodiment shown in FIG. 9 a control and output device of the measurement device M is integrated into the DSP (digital signal processor). If the measurement device is used in a stand-alone position, the control and output device may be part of the measurement device itself.

In order to be able to effectively compensate the PMD-related distortion of an optical signal, the magnitude of the PMD first has to be detected in a PMDC. This is done through the measurement device M. Using a beam splitter Tap-1 (a so-called tap), a small power component of the optical signal is branched off at the emulator output OUT (approximately 1–5%) and subsequently split into two signals of about the same intensity by means of a second power splitter Tap-2. One of the signal components is routed directly to a photo detector DP2 which detects the total intensity $P_{tot}$ (or the total optical power) of the optical signal. The other signal component reaches a polarizer POL via a polarization transformation element PT. The residual optical intensity $P_{pol}$ transmitted through the polarizer POL is detected by another photo detector, the photo detectors being designed such that they detect the optical power over the entire relevant wavelength range.

As already explained in detail above, the aim of the control by the control device R is to minimize the optical power $P_{pol}$ downstream of the polarizer. This control objective is synonymous with a high degree of polarization DOP, which in turn corresponds with a minimization of the PMD-related distortions. A power $P_{pol}=0$ means that all spectral components of the data signal occur with the same polarization (namely the polarization orthogonal with respect to the forward direction).

The control mechanism is based on a modulation or dither method, as is used, for example, in lock-in amplifiers. The control may be effected with a digital signal processor (DSP). Alternatively, it is also possible to design the control device as an analog circuit. Such a design is shown in FIG. 9. The square wildcards shown schematically in the bottom part of FIG. 9 designate customary phase-sensitive amplification and adding devices.

The following is a description on the basis of FIG. 8 of a control device using a DSP:

The DSP performs the following tasks:

ongoing measurement of the total optical power $P_{tot}$ and the power $P_{pol}$ downstream of the polarizer PD1 in the time frame of 256 μs, for example;

generation of (in this case) 12 modulation frequencies in a 3.9 kHz raster, for example;

synchronous computation of the control deviation for all twelve adjustment elements, i.e., for all fiber squeezers of the emulation device E, by means of a DFT;

generation of twelve adjustment signals for the adjustment elements of the emulation device E;

implementation of the endless algorithm; and monitoring and interface functions.

With its twelve control outputs the DSP has the possibility of moving all adjustment elements into their optimum positions. For this process to be executed quickly, a modulation technique (dithering) is implemented—as already mentioned above—with each adjustment signal being superimposed with a low-frequency modulation signal of a low amplitude, each adjustment element, i.e., each fiber squeezer, being assigned an individual modulation frequency (in the range of approximately 50–150 kHz). The modulation frequencies may be generated by the DSP or in an analog way. Via the modulation frequency an unequivocal identification of the adjustment element is thus possible. With, for example, 3.9 kHz the frequency distance is preferably selected such that whole-number periods of each frequency fit into the time raster of 256 μs. An error-free channel separation of the modulation channels is thus possible.

For this purpose, the DSP exhibits the following components in the embodiment described below:

a 2-channel analog-to-digital converter, 2A/D;

a CPU board, CPU;

two 12 channel digital-to-analog converters, 12D/A;

12 signal amplifiers 12PTZ-A for the adjustment elements (particularly for piezo-electric elements of a fiber squeezer); and a summation device Σ.

The control includes the following steps:

First, the polarized optical power $P_{pol}(t)$ is divided by the total optical power $P_{tot}(t)$ and thus normalized. Consequently, the quotient signal is independent of the absolute light power. Moreover, interfering amplitude-modulating signal components which stem from the 10 Gb/s data signal are "cancelled down" by quotient formation.

The DFT (discrete Fourier transformation) breaks down the quotient signal into the twelve amplitude and phase values of the modulation frequencies. The phase position (0 or 180 degrees) provides the information as to whether the control objective is reached at a higher or lower adjustment value so that direction information for the control is derived from this. From the amplitude Â of each frequency component, the information about the size of the control step is derived. With the control characteristic (linear progress of the adjustment value provides a sinusoidal power $P_{pol}$) taken into account, the optimum control step is approximated from an arcsinusoidal function.

$$\text{Step} = \pm C_1 \arcsin\frac{\hat{A}}{C_2} \quad C_1, C_2 = \text{constants}$$

The control steps $X_{delta}$ thus calculated for the twelve adjustment elements are then added to the earlier adjustment signals to produce a new adjustment signal, and the next control cycle commences.

$$X_{new} = X_{old} + X_{delta}$$

To produce an "endless control" it is advantageous to generate a "cost function" for each adjustment element which calculates exponentially rising costs when the adjustment value or signal nears the limits of the adjustment range. In proportion to these costs, the corresponding adjustment element is shifted by an amount x from its current adjustment value to an adjustment value in the direction of the center of the adjustment range. Let the adjustment range of an adjustment element be: $X_{min} \ldots X_{max}$
The center of the adjustment range is thus:

$$X_{center} = \frac{X_{min} + X_{max}}{2}$$

For a control without endless algorithm the new resulting setpoint position of the adjustment element is: $X_{new} = X_{old} + X_{delta}$
with $X_{delta}$ being the calculated optimum adjustment step. The endless algorithm, however, does not allow the full step, but generates a reset step which becomes larger the more the setpoint position moves away from the center position.
The displacement from the range center is: $X_{diff} = X_{new} + X_{center}$
The reset step is selected in proportion to a power of the displacement.

$$X_{reset} = \pm \frac{|X_{diff}|^n}{C}$$

n=6, C=const. The actual new position output to the adjustment element is thus:

$$X_{new} = X_{old} + X_{delta} + X_{reset}$$

The sign of the reset signal is selected such that it always shifts the new position towards the center of the range. This ensures that the adjustment function is transferred to another, redundant adjustment element that works in the central part of the range of its adjustment area and generates lower costs. This algorithm is performed in parallel on all adjustment elements.

On the basis of FIGS. 10-12 the following describes fiber squeezers which may be used in a stand-alone position or in an emulation or measurement device. Conventional fiber squeezers exhibit a very limited usability when a modulation technique, as describe above, is used. With the modulation technique, which is also referred to as the dither technique, the adjustment element is periodically modulated with a frequency (about 50–150 kHz) by a small amount around its adjustment value so that the direction of the amplitude for an optimum control is determined via measurement technology means. The modulation requires another frequency range in which the amount and the phase of the polarization modulation actually performed are approximately constant. In no case are resonance positions and amplitude or phase skips tolerable.

In order to optimize the practical measurement curves of phase squeezers in that way, attenuation elements are provided which suppress any oscillation other than the desired one (in the direction of expansion of the piezo-electric element). Elastic plastic foils, rubber and/or paper have proved to be particularly appropriate for this purpose. These materials may be employed between the side surfaces of the piezo-electric element and the surrounding structure to suppress transversal oscillations.

FIGS. 10 and 11 represent embodiments of a fiber squeezer which exhibit a slip or twist protection against an adverse influence of slipping or twisting of the fiber. The use of the PMF in the fiber squeezers requires the fiber to be turned in for the correct axial position prior to installation. During the application of the mechanical prestress and during operation and even in case of mechanical shock loads, the pre-adjusted position must not be lost.

Surprisingly, a particularly appropriate means of retaining the fiber orientation is at least a foil, preferably a metal foil, which is placed between the fiber 18 and the squeezing stamp 16. Both metal foils 22 and 24 are preferably bolted to the bearing housing 10 on both sides of the fiber 18. A twisting of the fiber 18 is excluded even if the piezo-electric element 16 slips on the upper metal foil 22.

The bottom foil 24 may be dispensed with because it fulfils no function with respect to any slipping. Alternatively, both (metal) foils may be produced from one piece 26 by folding. The fold additionally reduces the risk of slipping. Such a fiber squeezer is represented in FIG. 10.

Foils 22, 24, 26 also offer the advantage that they have a very smooth surface and thus conceal the roughness of the bottom pressure plate 20 and the piezo-electric element. The requirements with respect to the surface roughness may be reduced, which in turn saves production costs.

Another prerequisite for a reproducible and unchanging function of the fiber squeezer over a wide temperature range is a temperature-independent behavior so that the fiber squeezer design has to exhibit a passive temperature compensation. Otherwise, the mechanical pre-stress acting on the fiber and the adjustment range are dependent on the temperature. In the extreme case, in the event of a high temperature, the mechanical pre-stress may be totally lost when the metal structure of the fiber squeezer expands. The fiber then is without load and the polarization transformation element no longer achieves any effect. In another extreme case, when the temperature is low and the metal structure contracts, there may be an excessively high load acting on the fiber which leads to a failure.

The fiber squeezer structure should, if possible, be made of a single material that exhibits the same thermal expansion coefficient as the piezo-electric elements used. However, thermal coefficients that are comparable to standard piezo-electric materials (+1–3 ppm/deg.C.) are found only in ceramic materials. Yet, owing to their fracture susceptibility, these materials have a low reliability and their suitability for use in fiber squeezers is limited.

Advantageous is therefore a structure made of Invar® material, which is a special nickel alloy that exhibits an expansion coefficient that is very small for metals. However, a very good temperature behavior is achieved only if there is compensation of the thermal expansion. Such compensation is accomplished by counter-positioning a material with a large thermal expansion coefficient, such as a corresponding metal with high temperature coefficients $\alpha_k$.

To this end the fiber squeezer in FIG. 12 exhibits the following configuration. The fiber squeezer has a bearing housing 10 which is preferably made of Invar® material or another material with a small thermal expansion coefficient. The squeezing stamp 12 is firmly positioned at the bearing housing 10 and has a thermally compensating compensation element 14 to which the piezo-electric element 16 is attached. In the direction of the axial expansion of the piezo-electric element the compensation element has a length $L_K$ and the piezo-electric element has a length of $L_P$, which together make up the total length $L_M$. The piezo-electric element 16 exerts a mechanical pressure on the fiber 18 that is supported by a bottom pressure plate 20.

There is passive temperature compensation when the temperature-dependent longitudinal expansion of the piezo-electric element 16 and the compensation element 14 equal the length change of the surrounding bearing structure 10:

$$\alpha_P * L_P + \alpha_K * L_K = \alpha_M * L_M$$

Thus the present invention provides a PMD emulation, measurement and compensation device by using a controllable double refractive polarization transformation element in front of a double refractive DGD element as an emulation device to provide a controllable, random state of polarization for an input optical signal, samples the output optical signal to measure the degree of polarization, and controls the polarization transformation element using a modulation/dither technique accordingly to minimize the PMD in the output optical signal.

What is claimed is:

1. An emulation device for emulating a polarization mode dispersion (PMD) of an optical transmission system comprising
    an emulator input for an optical signal;
    at least one controllable birefringent polarization transformation element having a transformation element input and a transformation element output, which is designed for the polarization transformation of the optical signal;
    at least one birefringent DGD element having a DGD input and a DGD output, the DGD element comprising a differential group delay time DGD between two mutually orthogonally polarized propagation modes of the DGD element; and
    an emulator output for a PMD-modified optical output signal; said polarization transformation element and DGD element being disposed in relation to each other in an optical signal path between the emulator input and the emulator output such that birefringent axes at the transformation element output are twisted by a torsional angle which is different from zero degrees in relation to the birefringent axes at the DGD input.

2. The emulation device according to claim 1, the polarization transformation element further comprising at least one birefringent variable DGD with an adjustable differential group time $DGD_{var}$ that is adjustable for the transformation of the polarization.

3. The emulation device according to claim 2, wherein a quotient $DGD_{var}/DGD$ is smaller than 0.5 and preferably smaller than 0.1.

4. The emulation device according to claim 2, the polarization transformation element further comprising a plurality of birefringent variable DGD elements arranged one after the other in the signal path.

5. The emulation device according to claim 4, wherein neighboring variable DGD elements of the plurality of variable DGD elements are arranged such that their respective birefringent axes are twisted relative to each other by a torsional angle which is different from zero degrees.

6. The emulation device according to claim 1 wherein the torsional angle is 30 degrees to 60 degrees and preferably about 45 degrees.

7. The emulation device according to claim 1, the DGD element further comprising at least one polarization-maintaining optical fiber and/or at least one birefringent crystal; and the polarization transformation element further comprising at least one polarization-maintaining optical fiber, at least one birefringent crystal and/or at least one short single-mode optical fiber.

8. The emulation device according to claim 7, the polarization transformation element further comprising at least one mechanical adjustment element, which exerts a mechanical effect to modify $DGD_{var}$ and preferably comprises a fiber squeezer and/or stretcher.

9. The emulation device according to claim 8, the fiber squeezer or stretcher further comprising a piezo electric element which, for a damping of transversal oscillations, is guided in a bearing housing on the side by elastic oscillation attenuators.

10. The emulation device according to claim 8, the fiber squeezer or stretcher further comprising a piezo electric element which is positioned in such a way via a thermally compensating compensation element on a bearing housing that the resulting thermal expansion coefficient of the arrangement of the piezo electric element and the compensation element is equal to the thermal expansion coefficient of the bearing housing.

11. The emulation device according to claim 8, the fiber squeezer further comprising a squeezing stamp and a metal foil being arranged between the fiber to be squeezed and the squeezing stamp such that a twisting of the fiber is avoided when the squeezing stamp slips.

12. The emulation device according to claim 7, wherein the polarization-maintaining optical fiber of the polarization element at the transformation element output is spliced with the polarization-maintaining optical fiber of the DGD element at the DGD input so that the torsional angle between the birefringent axes at the transformation element output relative to those at the DGD input is not equal to 0 degrees.

13. The emulation device according to claim 1, further comprising a second birefringent DGD element being arranged between the emulator input and the polarization transformation element.

14. The emulation device according to claim 13, further comprising a second polarization transformation element being arranged between the emulator input and the second DGD element.

15. The emulation device according to claim 1, further comprising a plurality of polarization transformation elements and DGD elements being arranged between the emulator input and the emulator output in an alternating sequence, with at least on of the polarization transformation elements consisting of a variable DGD element or, as a maximum, two variable DGD elements with a twisted orientation relative to each other.

16. The emulation device according to claim 15, wherein the polarization transformation element of the emulator input side is comprised of several, particularly a maximum of four variable DGD elements twisted relative to each other, and the remaining elements being comprised of a variable DGD element or at least two variable DGD elements twisted relative to each other.

17. A compensation device for compensating polarization mode dispersion (PMD)-related distortions in an optical transmission system, comprising
    the emulation device according to any one of the above claims, the emulator input being designed to input a PMD-distorted optical signal and the emulator output being designed to output an optical signal;

a measurement device for measuring the PMD-related distortion of the optical signal and outputting a measurement output signal; and a control device, which sees the measurement output signal and which controls the emulation device in such a way that the latter minimizes, and preferably fully compensates, the PMD-related distortion.

18. A measurement device for measuring a polarization mode dispersion (PMD)-related distortion of an optical signal, comprising a measurement input for the optical signal;

at least one polarizer;

at least one polarization transformation element, which is designed for the polarization transformation of the optical signal and in which a signal path of the optical signal is arranged between the measurement input and the polarizer;

at least one photo detector for dectecting an intensity $P_{pol}$ of the optical signal, which is arranged in the signal path of the optical signal behind the polarizer; and a control and output device connected to the polarization transformation element and the photo detector, which controls the polarization transformation element such that the intensity $P_{pol}$ is either at a minimum or maximum level and generates a measurement output signal, which corresponds to the minimum or maximum intensity $P_{pol,min}$ or $P_{pol,max}$, respectively, as a measure of the PMD distortion of the optical signal.

19. A measurement device according to claim 18, further comprising a second photo detector being provided to detect a total intensity $P_{tot}$ of the optical signal in front of the polarization transformation element, and the control and output device outputting a measurement output signal corresponding to the normalized minimum or maximum intensity $P_{pol,min}/P_{tot}$ or $P_{pol,max}/P_{tot}$, respectively.

20. A measurement device according to claim 18, the polarization transformation element further comprising at least one variable DGD element with an adjustable differential group delay time $DGD_{var}$ for the transformation of the polarization.

21. A measurement device according to claim 20, the polarization transformation element further comprising two variable DGD elements which are arranged such that their respective birefringent axes are twisted relative to each other by a torsional angle that is different from zero degrees.

22. A measurement device according to claim 20, each of the variable DGD elements further comprising a polarization-maintaining optical fiber and a mechanical adjustment element which exerts a mechanical effect on the optical fiber to change $DGD_{var}$ and preferably a fiber squeezer and/or stretcher.

23. A compensation device for compensating polarization mode dispersion (PMD)-related distortions in an optical transmission system comprising an emulation device with an emulator input to input a PMD-distorted optical signal and an emulator output to output an optical output signal, the measurement device according to any one of the claims 19-22 to measure the PMD-related distortion of the optical signal and to output a corresponding measurement output signal; and a control device, which sees the measurement output signal and which controls the emulation device in such a way that the latter minimizes, and preferably fully compensates, the PMD-related distortion.

24. Compensation device for compensating polarization mode dispersion (PMD)-related distortions in an optical transmission system, comprising:

an emulation device with an emulator input to input a PMD-distorted optical signal and an emulator output to output an optical output signal, the emulation device comprising a plurality of controllable polarization transformation elements and a plurality of DGD elements; a measurement device for measuring the PDM-related distortion of the optical signal and outputting a measurement output signal; and a control device, which sees the measurement output signal and which controls the emulation device in such a way that the latter minimizes, and preferably fully compensates, the PMD-related distortion, the control device being designed to output an adjustment signal to the polarization transformation elements, which is superimposed with a periodic modulation signal, to detect, with a correct intensity and phase, corresponding modulation components in the measurement output signal, and to produce a new adjustment signal as a function of the modulation components detected.

25. The compensation device according to claim 24, wherein modulation frequencies of the modulation signals being different for each polarization transformation element and preferably lying in a frequency range of 20 kHz to 500 kHz, especially preferred, 40 kHz to 150 kHz.

26. The emulation device according to claim 5, wherein the torsional angle is 30 degrees to 60 degrees and preferably about 45 degrees.

* * * * *

UNITED STATES PATENT AND TRADEMARK OFFICE
CERTIFICATE OF CORRECTION

PATENT NO. : 6,996,297 B2
DATED : February 7, 2006
INVENTOR(S) : Krause, Egbert et al.

It is certified that error appears in the above-identified patent and that said Letters Patent is hereby corrected as shown below:

Column 23,
Line 32, insert -- input -- after "optical".

Column 24,
Line 52, "on" should read -- one --.

Column 25,
Line 4, delete soft return after "optical.".

Signed and Sealed this

Eleventh Day of April, 2006

JON W. DUDAS
*Director of the United States Patent and Trademark Office*